United States Patent [19]

Morin

[11] 4,382,394
[45] May 10, 1983

[54] INDEXING TURRET STOP FOR A MACHINE TOOL

[76] Inventor: Ronald N. Morin, 29219 Roycroft, Livonia, Mich. 48154

[21] Appl. No.: 207,476

[22] Filed: Nov. 17, 1980

[51] Int. Cl.³ .................... B23B 25/06; B23Q 17/00
[52] U.S. Cl. ............................................... 82/34 D
[58] Field of Search ............ 82/34 A, 34 B, 34 D; 408/14

[56] References Cited

U.S. PATENT DOCUMENTS

| | | |
|---|---|---|
| 766,828 | 8/1904 | Johnson . |
| 945,947 | 1/1910 | Hendrickson . |
| 1,205,970 | 11/1916 | Burrell . |
| 1,288,351 | 12/1918 | Wood . |
| 2,094,994 | 10/1937 | Lovely ................................ 82/21 |
| 2,361,453 | 9/1944 | Casella ................................ 82/21 |
| 2,491,381 | 12/1949 | Lange ................................. 29/65 |
| 2,616,158 | 11/1952 | Tomlinson ......................... 29/64 |
| 2,712,260 | 7/1955 | Wright ................................ 82/21 |
| 3,154,984 | 11/1964 | Waymouth .......................... 82/34 |
| 3,377,680 | 4/1968 | Matthey ............................. 29/65 |
| 3,417,478 | 12/1968 | Jeanneret ........................... 33/185 |
| 3,435,730 | 4/1969 | Berberian ........................... 90/14 |
| 3,464,297 | 9/1969 | McKenzie-Jones ................. 82/34 |
| 3,473,207 | 10/1969 | George ............................... 29/45 |
| 3,492,897 | 2/1970 | Cunningham et al. ............ 82/21 |
| 3,545,320 | 12/1970 | Anderson ........................... 82/34 |
| 3,589,219 | 6/1971 | Parsons .............................. 82/34 |
| 3,590,673 | 7/1971 | Foll et al. ........................... 82/21 |
| 3,626,791 | 5/1970 | Henderson ...................... 82/34 D |
| 3,636,914 | 1/1972 | Speed .............................. 82/34 A |
| 3,663,999 | 5/1972 | Catlin ................................. 29/44 |
| 3,724,964 | 4/1973 | Needham, Jr. ..................... 408/14 |
| 3,853,420 | 12/1974 | Abell ................................. 408/14 |
| 3,998,114 | 12/1976 | Nevery ............................ 82/34 D |
| 4,018,113 | 4/1977 | Blazenin et al. ................... 82/2 B |

FOREIGN PATENT DOCUMENTS

| | | | |
|---|---|---|---|
| 1206562 | 3/1958 | France ............................ 82/34 D |
| 468497 | 6/1952 | Italy ............................... 82/34 A |

Primary Examiner—Leonidas Vlachos
Assistant Examiner—Jerry Kearns
Attorney, Agent, or Firm—Harness, Dickey & Pierce

[57] ABSTRACT

An indexing turret stop assembly for a machine tool to provide variable stop indications. The indexing turret stop is generally comprised of a base structure for providing a turret platform and a predetermined number of indexed positions of rotation, and a plurality of stop rod assemblies extending perpendicularly from the base structure and corresponding to the number of indexed positions of rotation. Each stop rod assembly provides sliding and rotational adjustment to vary the overall length of the assembly. A dial micrometer is provided in combination with the indexing turret stop to provide an indication of the proper stopping position.

8 Claims, 5 Drawing Figures

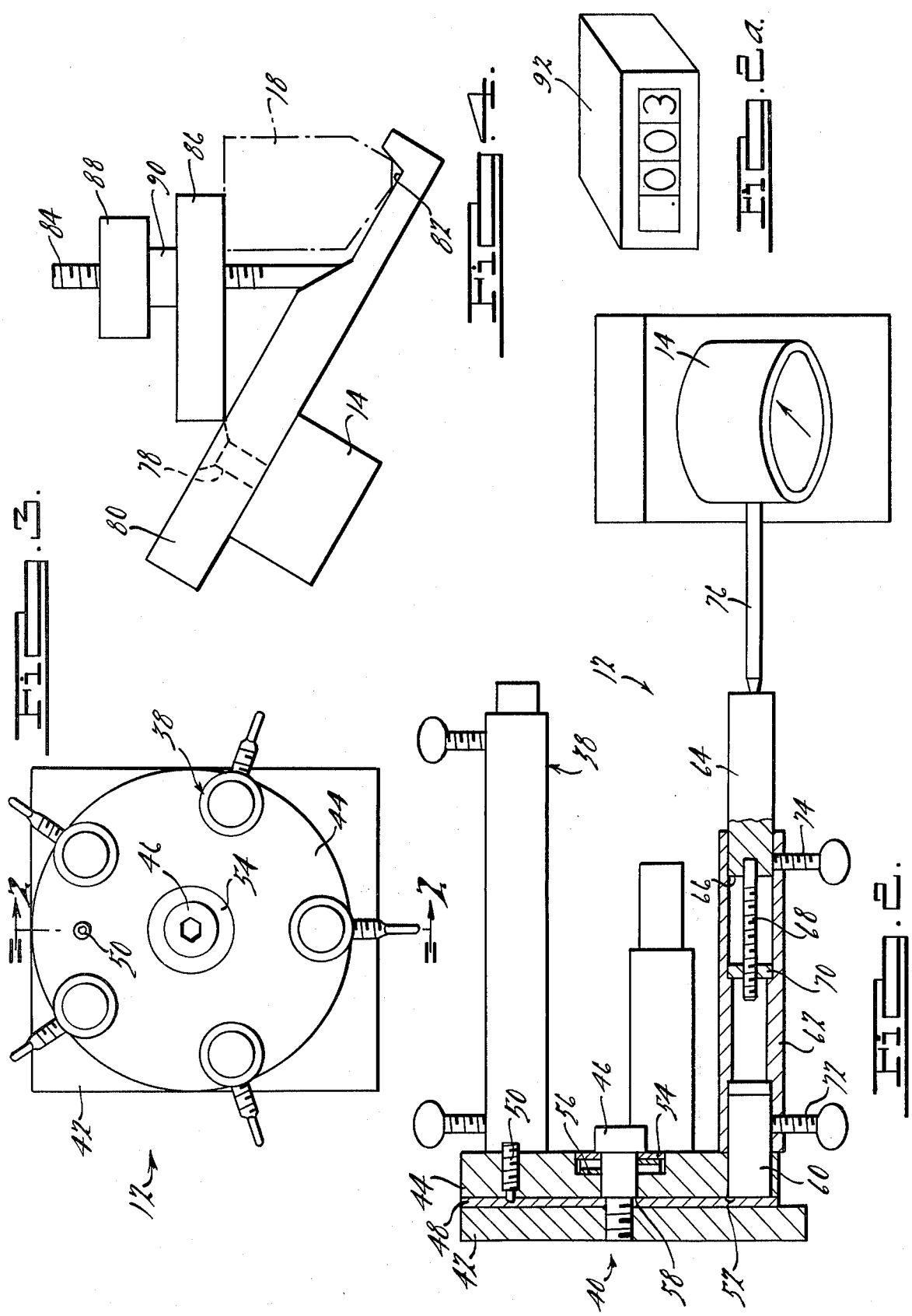

INDEXING TURRET STOP FOR A MACHINE TOOL

BACKGROUND AND SUMMARY OF THE INVENTION

The present invention relates generally to tool stops for machine tools, and particularly to indexing tool stops with multiple stop rods variable in length.

Tool stops have generally been utilized in machine tools having a displaceable tool, such as lathes, drills, and so forth, to limit the extent of the movement of the tool. When various cutting depth are employed or when the machine tool has multiple cutting tools, it is usually desirable for the tool stop to provide for many different stop positions. Prior tool stops have supplied this capability by providing for multiple stop rods or screws variable in length mounted for rotational movement. Thus, the length of each stop rod may be individually set, and the particular stop rod to be employed may be selected by rotating the tool stop to the desired position. Since the usual application of these prior tool stops has been to physically arrest further movement of a tool cutting carriage, these tool stops have been necessarily of heavy-duty construction. Further, various tools have been required to adjust the length of the stop rods and/or rotation of the tool stop.

The present invention provides a novel indexing turret-type tool stop in which no tools are necessary to affect adjustment in the length of the stop rods or the rotation of the tool stop. Thus, the indexing turret stop of the present invention may be characterized as providing rapid adjustments to minimize the time required to machine a work piece. Further, high cost heavy-duty construction is not employed in the indexing turret stop of the present invention, as the turret stop need not physically impede the movement of a tool cutting carriage. According to the present invention, the turret stop cooperates with a plunger-type dial micrometer to provide the indication of where the tool cutting carriage should be stopped. This combination also provides added flexibility as the depth of the cut may be varied by merely stopping the tool cutting carriage at a different reading on the dial micrometer.

The indexing turret stop according to the present invention is generally comprised of a base structure for providing a turret platform and a predetermined number of indexed positions of rotation, and a plurality of stop rod assemblies extending perpendicularly from the base structure and corresponding to the number of the indexed positions of rotation. The stop rod assemblies generally comprise a first rod mounted to the base structure, a cylindrical sleeve member slidably disposed on the first rod, a second rod threadingly received in the opposite end of the sleeve member, and a hand adjustable set screw mounted at each end of the sleeve member for restricting the movement of the sleeve member with respect to the first rod and for restricting the movement of the second rod with respect to the sleeve member. Thus, each stop rod provides for two length adjustments, one effected by a sliding movement, and the other effected by a rotational movement.

Other features and advantages of the invention will become apparent in view of the drawings and the following detailed description of the preferred embodiment.

BRIEF DESCRIPTION OF THE DRAWINGS

FIG. 2 is another view, partially in cross-section, of the indexing turret stop shown in FIG. 1.

FIG. 2a is a perspective view of a digital display type micrometer.

FIG. 3 is a cross-sectional view of the indexing turret stop shown in FIG. 2 along lines B—B.

FIG. 4 is a side elevation view of the dial micrometer shown in FIG. 1 and the structure for coupling the micrometer to one of the ways of the lathe.

DETAILED DESCRIPTION OF THE PREFERRED EMBODIMENT

Figure 1:
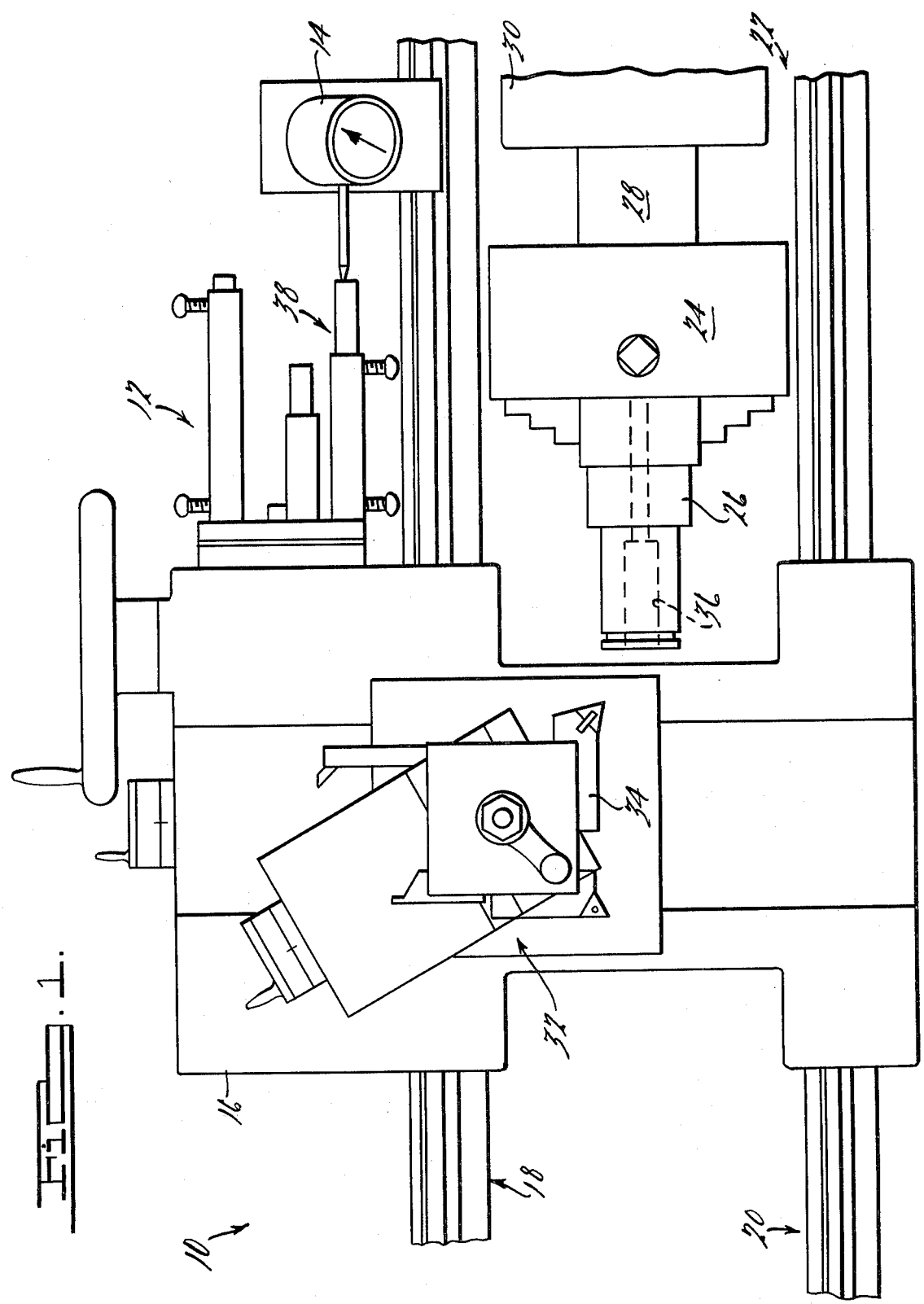
FIG. 1 is a top elevation view of a lathe employing the indexing turret stop according to the present invention.

Referring to FIG. 1, a lathe 10 is shown employing an indexing turret stop 12 and dial micrometer 14 according to the present invention. The indexing turret stop is mounted on a tool cutting carriage 16, while the micrometer is mounted on a way 18 of the lathe. The tool cutting carriage is movable on ways 18 and 20 relative to a stationary headstock assembly, generally designated at 22. The headstock assembly includes a chuckhead 24 for clamping a workpiece 26, and a spindle bar 28 attached to the chuckhead at one end and rotatably mounted to bearing structure 30 at the other end. The tool cutting carriage includes a tool turret assembly, generally designated at 32, which includes a plurality of cutting tools 34.

As may be appreciated by one skilled in the art, the tool cutting carriage 16 is moved along ways 18 and 20 to engage and machine the exterior surface of the rotating workpiece 26 to a desired depth. By rotating the tool turret assembly 32 to employ a different tool, a bore 36 also may be machined into the workpiece. As indicated by the shape of the workpiece, several different cutting depths may be required during the machining of the workpiece. According to the present invention, an indication of the proper cutting depths may be provided by the indexing turret stop 12 in combination with the dial micrometer 14. This is achieved in three steps. First, one of the plurality of stop rod assemblies 38 is selected. Second, the length of the stop rod assembly chosen is adjusted, as will be described in detail with respect to FIG. 2. Third, the position of the micrometer on the way 18 is selected so that a specific reading on the dial of the micrometer will correspond to the point at which it is desired to stop the movement of the tool cutting carriage 16. For other cutting depths, the process is repeated, although the depth may be such that the dial micrometer need not be re-positioned. It should also be noted that with minor differences in cutting depths, a previous selection of a particular stop rod assembly and length thereof may remain the same. In such a case, a different reading on the micrometer dial may be employed to indicate the proper stopping position. As may be appreciated by one skilled in the art, devices other than a dial micrometer may be employed in combination with the indexing turret stop. For instance, a switch may be employed to turn on a light or activate a means for arresting the movement of the tool cutting carriage when contact is made with the stop rod assembly selected.

Referring to FIG. 2, another view of the indexing turret stop 12 is shown (partially in cross section) in combination with the dial micrometer 14. The indexing turret stop is generally comprised of a base structure 40 and a plurality of stop rod assemblies 38. In particular, the base structure includes a base plate 42 for mounting the indexing turret stop to the tool cutting carriage, a turret platform 44 movably secured to the base plate by bolt 46, an indexing plate 48 interposed between the base plate and turret platform, and a spring loaded ball-catch screw 50 mounted in the turret platform. The indexing plate includes a plurality of indentations 52, corresponding to the number of stop rod assemblies, for cooperating with the spring loaded ball-catch screw to provide the indexed positions of rotation.

Interposed between the bolt 46 and the turret platform 44 are two washers, namely disc washer 54 and spring washer 56. When the bolt is securely tightened down, surface 58 of the bolt forces the base plate 42 and the indexing plate together, and prevents relative movement between them. However, the spring washer 56 of the spring loaded ball catch screw 50 allows relative rotational movement between the indexing plate 48 and the turret platform 44. A suitable lubricant may also be provided between the indexing plate and the turret platform in order to reduce the force required to rotate the turret platform.

Referring now to FIGS. 2 and 3, the indexing turret stop 12 is shown to include 5 stop rod assemblies 38 disposed around the perimeter of the turret platform 44 and extending perpendicularly therefrom. Each stop rod assembly is generally comprised of a first rod 60 mounted in the turret platform, a cylindrical sleeve member 62 slidably disposed on the first rod, and a second rod 64 threadingly received in the opposite end of the sleeve member. The second rod is provided with an internally threaded end for receiving a rod screw 68, which couples the second rod to a threaded seat 70 of the sleeve member for rotational movement relative to the sleeve member. Thus each stop rod assembly is provided with two ways to vary its overall length, namely a sliding (course) adjustment between the first rod and the sleeve member and a rotational (fine) adjustment between the sleeve member and the second rod. Each stop rod assembly is further provided with two hand adjustable set screws 72 and 74, disposed at opposite ends of the sleeve member. Set screw 72 is used to restrict the movement of the sleeve member with respect to the first rod, and set screw 74 is used to restrict the movement of the second rod with respect to the sleeve member.

It should be noted that in the preferred embodiment each of the sleeve members 62 has a different length, while each of the first rods 60 have generally the same length and each of the second rods 64 have generally the same length. Thus, the indexing turret stop 12 as a whole presents three ways to provide different cutting depth indications. First, by selecting which stop rod assembly 38 is to be employed, and then by selecting the length of that stop rod assembly using the sliding and rotational adjustments. Then, when the dial micrometer 14 is used in combination with the indexing turret stop, a fourth way of indicating the proper cutting depth is available. Since the plunger 76 of the micrometer is axially movable, a different cutting depth indication is provided by using a different reading on the micrometer. However, it should be appreciated by one skilled in the art added flexibility may be achieved by providing different lengths for the first and second rods, as well as for the sleeve member. Finally, it should be apparent from the foregoing description that all of the selections or adjustments may be readily accomplished by hand, without any recourse to special wrenches or other tools.

Referring to FIG. 4, a side elevation view of the dial micrometer 14 and the structure for coupling same to the way 18 of the lathe is shown. As indicated by bore 78, the micrometer is bolted to a support plate 80, which engages the way at surface 82. Also secured to the support plate, is a screw 84, which is used to clamp a coupling plate 86 to the way. The coupling plate is bolted or clamped to the way by a hand adjustable nut 88. One or more washers 90 may also be interposed between the coupling plate and the nut. It should be noted that the present invention is not limited to the particular type of micrometer illustrated in FIGS. 2 and 4. For example, the micrometer may also be of a type which provides for a digital display, such as micrometer 92, shown in FIG. 2a.

With respect to the materials used to construct the indexing turret stop and micrometer support structure, it is preferred that aluminum generally be used. However, any other suitable material without departing from the nature of the invention.

It will be appreciated by those skilled in the art that various changes and modifications may be made to the indexing turret stop described in the specification without departing from the spirit and scope of the invention as defined by the appended claims. The preferred embodiment set forth above was for the purpose of illustration and was not intended to limit the invention.

What is claimed is:

1. An indexing turret stop apparatus for a machine tool, comprising:
   base means including a turret platform and a predetermined number of indexed positions of rotation; and
   a plurality of stop rod assemblies varying in length and corresponding to the number of said indexed positions of rotation, each having first rod means mounted to said turret platform and extending perpendicularly therefrom for providing a coarse adjustment in the length of said stop rod assembly, a cylindrical sleeve member having a seat portion and slidably disposed on said first rod means generally at a first end of said sleeve member, second rod means generally received in a second end of said sleeve member for providing a fine adjustment in the length of said stop rod assembly, said second rod means including a screw portion threadingly connected to said seat portion of said sleeve member, and first manually adjustable set screw means for restricting the movement of said sleeve member with respect to said first rod means and second manually adjustable set screw means for restricting the movement of said second rod means with respect to said sleeve member.

2. The indexing turret stop apparatus according to claim 1, wherein each of said plurality of sleeve member has a different length.

3. The indexing turret stop apparatus according to claim 2, wherein each of said plurality of first rod means have generally the same length, and each of said plurality of second rod means have generally the same length.

4. The indexing turret stop apparatus according to claim 3, wherein said second rod means is comprised of a rod member having an internally threaded end and a generally flat surface end, and a rod screw having one end received in said threaded end of said rod member.

5. The indexing turret stop apparatus according to claim 4, wherein said generally flat surface end of said rod mewmber cooperates with a plunger of a dial micrometer to provide a stopping indication for said machine tool.

6. The indexing turret stop apparatus according to claim 1, wherein said base means comprises a base plate securable to said machine tool, a turret platform movably secured to said base plate for rotational movement relative to said base plate, and indexing means for providing a predetermined number of indexed positions of rotation.

7. The indexing turret stop apparatus according to claim 6, wherein said indexing means includes an indexing plate, interposed between said base plate and said turret platform, having a plurality of indentations facing said turret platform, and a spring loaded ball catch screw mounted in said turret platform and cooperating with said indentations to provide said predetermined number of indexed positions of rotation.

8. An indexing turret stop apparatus for a machine tool having a headstock assembly carrying a work piece and a tool cutting carriage movable relative to said headstock assembly along a plurality of ways, comprising:
 (a) a base plate secured to said tool cutting carriage;
 (b) a turret platform movably secured to said base plate for rotational movement relative to said base plate;
 (c) an indexing plate, interposed between said base plate and said turret platform, having a plurality of indentations facing said turret platform;
 (d) a spring loaded ball catch screw mounted in said turret platform and cooperating with said indentations to provide a predetermined number of indexed positions of rotation;
 (e) a plurality of stop rod assemblies varying in length and corresponding to the number of said indexed positions of rotation, each having a first rod mounted in said turret platform and extending perpendicularly therefrom for providing a course adjustment in the length of said stop rod assembly, a cylindrical sleeve member having a threaded nut portion and slidbaly disposed on said first rod, a first set screw mounted on said sleeve member for restricting the relative movement of said sleeve member on said first rod, a second rod disposed at the other end of said sleeve member and received therein for providing a fine adjustment in the length of said stop rod assembly, a rod screw fixedly attached to said second rod for coupling said second rod to said threaded seat portion in said sleeve member and permitting rotational movement of said second rod with respect to said sleeve member, and a second set screw mounted on said sleeve member for restricting the rotational movement of said second rod with respect to said sleeve member; and
 (f) micrometer means, mounted to one of said ways, cooperating with a selected one of said stop rod assemblies to provide a stop indication for the movement of said tool cutting carriage toward said headstock assembly.

* * * * *